United States Patent [19]

Sorimachi et al.

[11] Patent Number: 5,360,254
[45] Date of Patent: Nov. 1, 1994

[54] AUTOMOBILE WITH MOVABLE ROOF STORABLE IN TRUNK LID

[75] Inventors: Toshihiro Sorimachi, Tokyo; Fumio Furuki, Tochigi; Shoichi Narita, Tochigi; Satoru Azumi, Tochigi; Mitsuru Hirai, Tochigi, all of Japan

[73] Assignee: Honda Giken Kogyo Kabushiki Kaisha, Tokyo, Japan

[21] Appl. No.: 24,274

[22] Filed: Feb. 26, 1993

[30] Foreign Application Priority Data

Feb. 26, 1992 [JP] Japan .................. 4-075453
Feb. 26, 1992 [JP] Japan .................. 4-075454
Feb. 26, 1992 [JP] Japan .................. 4-075460

[51] Int. Cl.⁵ ............................... B60J 7/02
[52] U.S. Cl. ...................... 296/218; 296/37.1; 296/224
[58] Field of Search ............ 296/37.1, 218, 224; 292/DIG. 5, DIG. 46, 304

[56] References Cited

U.S. PATENT DOCUMENTS 4,819,983 4/1989 Alexander et al. ...... 292/DIG. 5 X
5,031,949 7/1991 Sorimachi et al. ............ 296/216 X
5,186,516 2/1993 Alexander et al. ...... 292/DIG. 5 X

FOREIGN PATENT DOCUMENTS 4006619 9/1991 Germany ..................... 296/224
3-79429 4/1991 Japan .

Primary Examiner—Dennis H. Pedder
Attorney, Agent, or Firm—Armstrong, Westerman, Hattori, McLeland & Naughton

[57] ABSTRACT

A tilt-up device tilts a rear end of a movable roof upwardly when the movable roof is moved from a normal position above the passenger's compartment of an automobile. The tilt-up device is mounted on a surface, which faces the passenger's compartment, of a fixed roof substantially centrally thereon in a transverse direction of the automobile body, and is positioned in front of a seal on the fixed roof. A trunk lid lifting and lowering device is mounted in a trunk and connected to an end of a trunk lid for selectively lifting the trunk lid away from a trunk and lowering the trunk lid toward the trunk. The trunk lid lifting and lowering device has a stopper device for inactivating the trunk lid lifting and lowering device when the trunk lid is locked by a lock device with the trunk lid lowered. The trunk lid has a roof storage region for storing the movable roof which has moved from the normal position, and a roof slide device having an engaging pin for entering a hole defined in the movable roof and opening at one end thereof. A device is mounted in the movable roof for connecting the engaging pin inserted in the hole to the movable roof to lift an end of the movable roof opposite to the hole.

4 Claims, 18 Drawing Sheets

AUTOMOBILE WITH MOVABLE ROOF STORABLE IN TRUNK LID

BACKGROUND OF THE INVENTION

1. Field of the Invention

The present invention relates to an automobile having a movable roof movable from a normal position above a passenger's compartment, and a vertically movable trunk lid having a roof storage region for storing the movable roof that has moved from the normal position.

2. Description of the Prior Art

Japanese patent publication No. 3-79429 discloses an automobile having a trunk lid lifting and lowering device for lifting and lowering a trunk lid while maintaining the trunk lid substantially horizontally, a roof sliding device for bringing the rear end of a movable roof into engagement with the trunk lid to slide the movable roof back and forth, and a roof storage region defined in the trunk lid for storing the movable roof therein.

When the movable roof is mounted in its normal position, the rear end of the movable roof is superimposed on the upper surface of a fixed roof or roll bar. When the trunk lid is lifted, sliders move forwardly in the trunk lid until lock shafts joined to the sliders are fitted into respective holes that are defined in the rear end of the movable roof. The movable roof is then locked on the lock shafts by a lock device disposed on the upper surface of the roll bar. Then, the trunk lid is elevated again with the movable roof lifted off the roll bar, and the sliders are moved rearwardly to slide the movable roof into the roof storage region in the trunk lid. Subsequently, the trunk lid with the movable roof stored therein is lowered.

When the movable roof is thus stored in the trunk lid, the lock device on the roll bar is exposed to view, thus making the roll bar poor in appearance.

A water seal may be mounted on the front edge of the roll bar to seal the Joint between the front edge of the roll bar and the rear end of the movable roof when the movable roof is positioned over the passenger's compartment. The lock device on the roll bar is then positioned behind the water seal. Therefore, when the movable roof is closed, rainwater tends to enter the lock device.

When the trunk lid is lowered closing the trunk, the rear end of the trunk lid is fixed to the automobile body by a lock. Since, however, no lock is available to secure the front end of the trunk lid to the automobile body, the front end of the trunk lid is liable to fluctuate due to vibrations of the automobile and wind pressure applied thereto while the automobile is running.

Another water seal may be disposed between the automobile body and the entire peripheral edge of the movable roof for preventing water from entering the passenger's compartment. At the time the movable roof moves into and out of the trunk lid, it is supported in a cantilevered fashion by the lock shafts that engage the rear end of the movable roof. Thus, the front end of the movable roof as it moves into and out of the trunk lid is apt to drop due to gravity into physical interference with the water seal.

SUMMARY OF THE INVENTION

It is an object of the present invention to provide an automobile having a tilt-up device for tilting a rear end of a movable roof upwardly when the movable roof is to move from a normal position above a passenger's compartment.

Another object of the present invention is to provide an automobile having a trunk lid lifting and lowering device for selectively lifting and lowering a trunk lid while maintaining the trunk lid horizontally, the trunk lid lifting and lowering device being locked against operation when the trunk lid is locked to the trunk.

Still another object of the present invention is to provide an automobile having a device for preventing a movable roof from interfering with a seal on an automobile body when the movable roof is to move to and from a normal position above a passenger's compartment.

According to the present invention, there is provided an automobile comprising an automobile body including a passenger's compartment, a fixed roof, and a movable roof normally positioned above the passenger's compartment in front of the fixed roof, means for moving the movable roof across and over the fixed roof, a seal mounted on the fixed roof, the seal being positioned between a rear end of the movable roof and the fixed roof when the movable roof is normally positioned above the passenger's compartment, and a tilt-up device for tilting a rear end of the movable roof upwardly when the movable roof is moved, the tilt-up device being mounted on a surface of the fixed roof substantially centrally thereon in a transverse direction of the automobile body, the surface facing the passenger's compartment, the tilt-up device being positioned in front of the seal.

According to the present invention, there is also provided an automobile comprising an automobile body including a trunk and a trunk lid for selectively opening and closing the trunk, a lock device mounted in the trunk for locking one end of the trunk lid to the trunk when the trunk lid closes the trunk, and a trunk lid lifting and lowering device mounted in the trunk and connected to an opposite end of the trunk lid for selectively lifting the trunk lid away from the trunk and lowering the trunk lid toward the trunk, the trunk lid lifting and lowering device having stopper means for inactivating the trunk lid lifting and lowering device when the one end of the trunk lid is locked by the lock device with the trunk lid lowered.

According to the present invention, there is further provided an automobile comprising an automobile body having a movable roof movable from a normal position above a passenger's compartment, the movable roof having a hole defined therein and opening at an end thereof, a roof storage member for storing the movable roof which has moved from the normal position, the roof storage member having an engaging pin for entering the hole, and a device mounted in the movable roof for connecting the engaging pin inserted in the hole to the movable roof to lift an end of the movable roof opposite to the hole.

According to the present invention, there is further provided an automobile comprising an automobile body including a passenger's compartment, a fixed roof, a movable roof normally positioned above the passenger's compartment in front of the fixed roof, a trunk behind the fixed roof, and a trunk lid for selectively opening and closing the trunk, means for moving the movable roof across and over the fixed roof, a seal mounted on the fixed roof, the seal being positioned between a rear end of the movable roof and the fixed roof when the movable roof is normally positioned above the passenger's compartment, a tilt-up device for tilting a rear end of the movable roof upwardly when the movable roof is moved, the tilt-up device being mounted on a surface of the fixed roof substantially centrally thereon in a transverse direction of the automobile body, the surface facing the passenger's compartment, the tilt-up device being positioned in front of the seal, a lock device mounted in the trunk for locking one end of the trunk lid to the trunk when the trunk lid closes the trunk, a trunk lid lifting and lowering device mounted in the trunk and connected to an opposite end of the trunk lid, for selectively lifting the trunk lid away from the trunk and lowering the trunk lid toward the trunk, the trunk lid lifting and lowering device having stopper means for inactivating the trunk lid lifting and lowering device when the one end of the trunk lid is locked by the lock device with the trunk lid lowered, the trunk lid having a roof storage region for storing the movable roof which has moved from above the passenger's compartment, and a roof slide device having an engaging pin for entering a hole defined in the movable roof and opening at one end thereof, and a device mounted in the movable roof for connecting the engaging pin inserted in the hole to the movable roof to lift an end of the movable roof opposite to the hole.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
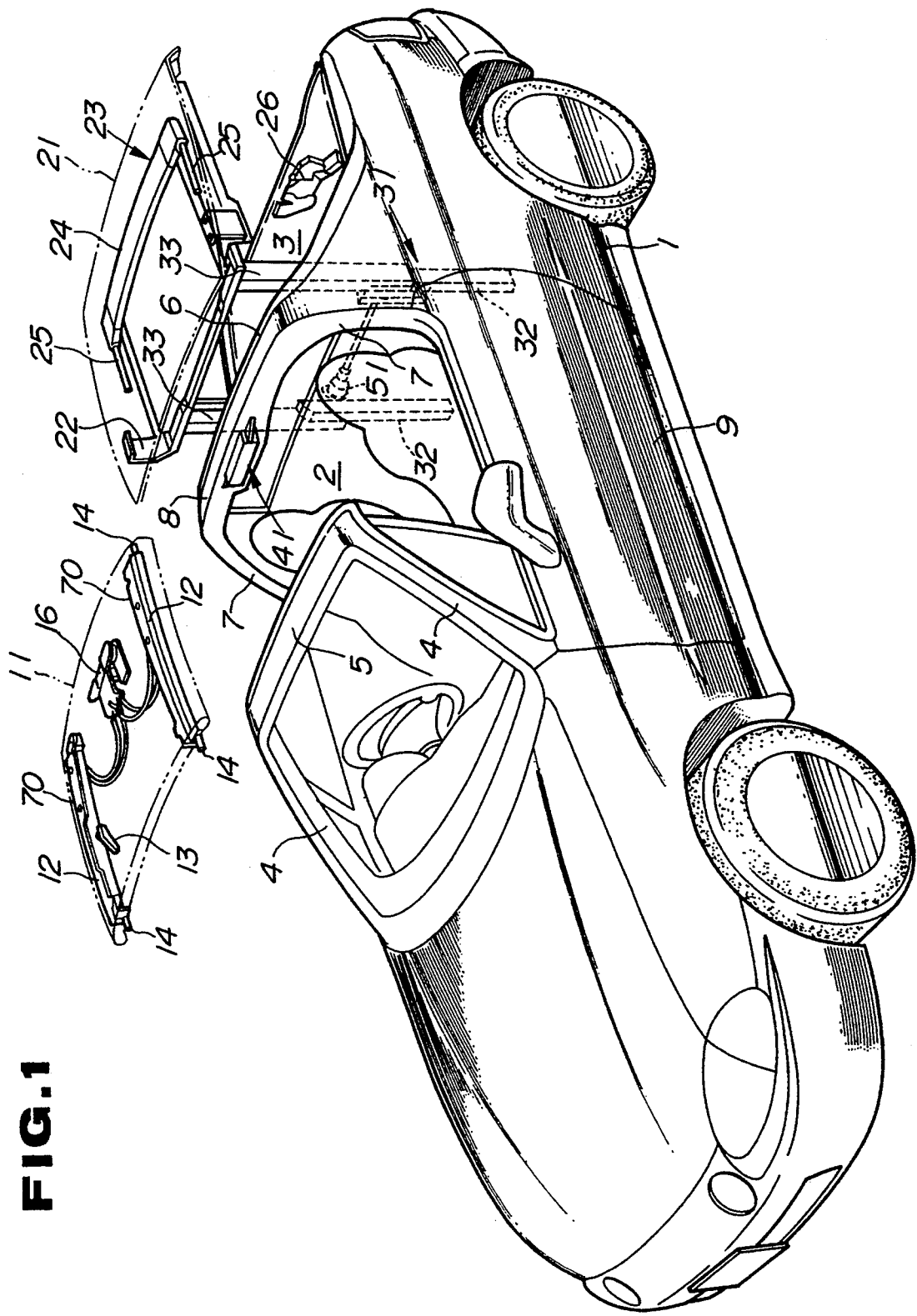
FIG. 1 is a partly explosive, perspective view of an automobile with a movable roof according to the present invention.

As shown in FIG. 1, an automobile comprises an automobile body 1 having a passenger's compartment 2 and a trunk 3 positioned behind the passenger's compartment 2. The automobile body 1 also includes a pair of front pillars 4 positioned in front of the passenger's compartment 2, a front pillar cross member 5 horizontally interconnecting the upper ends of the front pillars 4, a roll bar 6 horizontally interconnecting the upper ends of a pair of rear pillars 7 positioned between the passenger's compartment 2 and the trunk 3, the roll bar 6 serving as a fixed rear roof rail 8, and a pair of sashless doors 9 with window glass panels for openably closing side openings of the passenger's compartment 2.

The front pillars 4 and the front pillar cross member 5 jointly serve as a front windshield frame holding a front windshield. The roll bar 6 and the rear pillars 7 jointly serve as a rear window glass panel frame holding a rear window glass panel. The rear window glass panel can be lifted and lowered by a power window winder with an electric motor.

The automobile body 1 further includes a movable roof 11 for openably closing an upper opening of the passenger's compartment 2, and a trunk lid 21 for openably closing an upper opening of the trunk 3.

The movable roof 11 is normally positioned between the rear roof rail 8 and the front pillar cross member 5, closing the upper opening of the passenger's compartment 2.

The movable roof 11 has a pair of laterally spaced, manually operable roof side lock devices 12 disposed along opposite side edges thereof, and a central handle 16 disposed laterally centrally in a rear portion thereof for actuating a pair of laterally spaced, manually operable pin locking mechanisms 70.

The roof side lock devices 12 have respective side levers 13 (one shown in FIG. 1) that can manually be turned to move front and rear lock pins 14 thereof into and out of holes (not shown in FIG. 1) defined in a rear end of the front pillar cross member 5 and a front end of the rear roof rail 8. When the front and rear lock pins 14 are inserted in the front pillar cross member 5 and the rear roof rail 8, the movable roof 11 is securely locked with respect to the front pillar cross member 5 and the rear roof rail 8.

The trunk lid 21 has a roof storage region 22 defined therein for receiving the movable roof 11 that enters the roof storage region 22 through a front end of the trunk lid 21, and a motor-driven roof slide device 23 disposed in the trunk lid 21.

The roof slide device 23 comprises a transverse slider 24 that is movable back and forth by an electric motor (not shown). The slider 24 has a pair of engaging pins 25 projecting forwardly from lateral ends thereof. When the slider 24 is moved forwardly by the electric motor, the engaging pins 25 can be inserted into respective holes (not shown in FIG. 1) defined in laterally opposite ends of a rear end of the movable roof 11.

A trunk lid lock device 26 for locking and unlocking the trunk lid 21 in its closed position is mounted on an inner surface of a rear panel of the trunk 3. The trunk lid lock device 16 may comprise an electromagnetic actuator for locking and unlocking the trunk lid 21 in response to operation of a switch.

The trunk 3 houses a motor-driven trunk lid lifting and lowering device 31 disposed in a front portion thereof for lifting and lowering the trunk lid 21 while maintaining the trunk lid 21 substantially horizontally.

The trunk lid lifting and lowering device 31 comprises a pair of laterally spaced vertical guide rails 32 fixed to a front panel of the trunk 3, and a pair of vertically movable frames 33 slidably engaging the guide rails 32, respectively. The frames 33 can be vertically moved along the respective guide rails 32 by an electric motor and a feed screw mechanism, which are omitted from illustration in FIG. 1. The front end of the trunk lid 21 is horizontally secured to the upper ends of the frames 33.

The rear roof rail 8 supports, on a laterally central portion of its front end, a motor-driven tilt-up device 41 for tilting the rear end of the movable roof 11 upwardly.

Figure 2:
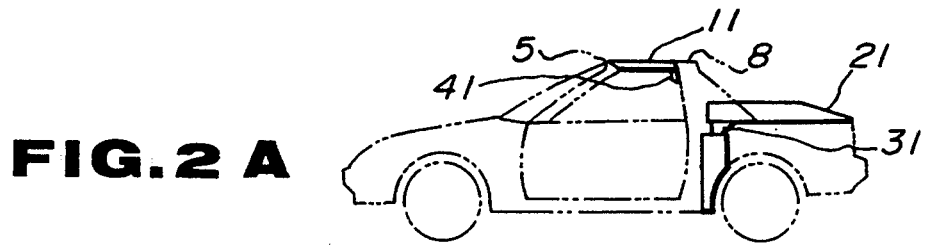
FIGS. 2A through 2F are schematic side elevational views showing the manner in which the movable roof is stored in a trunk lid and the trunk lid is lifted and lowered.
Figure 2:
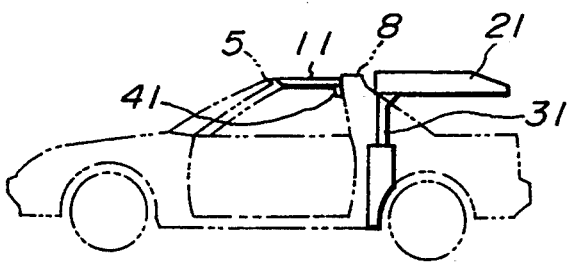
Figure 2:
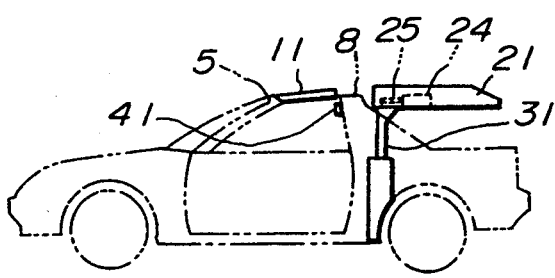
Figure 2:
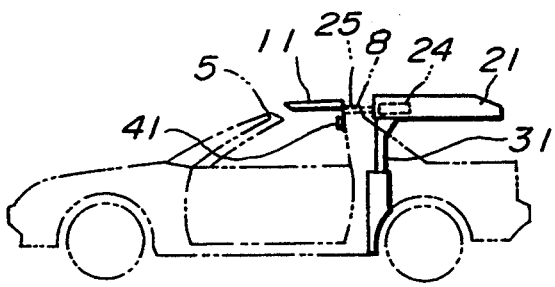
Figure 2:
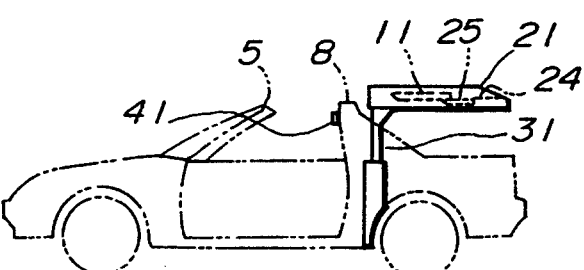
Figure 2:
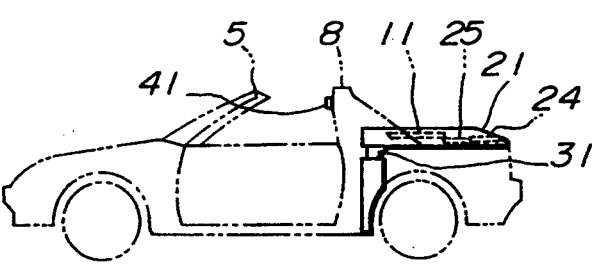

FIGS. 2A through 2F show a sequence of movement of the movable roof 11 as it is stored into the roof storage region 22 in the trunk lid 21, and also movement of the trunk lid 21 as it is lifted and lowered. Normally, the movable roof 1 is mounted in its closed position over the passenger's compartment 2 as shown in FIG. 2A. Before a switch for opening and closing the movable roof 11 is turned on, the driver of the automobile manually turns the side levers 13 to release the side lock devices 12 of the movable roof 11.

Then, the driver turns on the switch for opening and closing the movable roof 11. First, the window glass panels of the doors 9 are lowered, and the trunk lid lock device 26 is released. Then, the trunk lid lifting and lowering device 31 is actuated to lift the trunk lid 21 into the position shown in FIG. 2B.

The tilt-up device 41 is then actuated to lift the rear end of the movable roof 11 upwardly as shown in FIG. 2C.

Thereafter, the roof slide device 23 is actuated to move the slider 4 forwardly in the trunk lid 21 until the engaging pins 25 enter the holes in the rear end of the movable roof 11. The tilt-up device 41 is then actuated to make a first lowering motion.

The driver then turns off the switch for opening and closing the movable roof 11 and manually turns the central handle 16 into an open position to cause the pin locking mechanisms 70 to lower the rear end of the movable roof 11 into locking engagement with the engaging pins 25. Now, as shown in FIG. 2D, the front end of the movable roof 11 is lifted off the front pillar cross member 5.

The driver turns on the switch for opening and closing the movable roof 11 again to enable the tilt-up device 41 to make a second lowering motion.

The slider 24 is moved rearwardly to move the movable roof 11 back into the roof storage region 22 in the trunk lid 21, as shown in FIG. 2E.

Then, as shown in FIG. 2F, the trunk lid lifting and lowering device 31 lowers the trunk lid 21 into its closed position in which the trunk 3 is closed thereby. When the trunk lid 21 reaches its closed position, the trunk lock device 26 is actuated to lock the rear end of the trunk lid 21. In this manner, the movable roof 11 is stored into the trunk lid 21, thus opening the passenger's compartment 2 upwardly, and the trunk lid 21 is lifted and lowered.

The movable roof 11 can be removed out of the trunk lid 21 and brought back into its closed position over the passenger's compartment 2 in a process which is the reversal of the above process described with reference to FIGS. 2A through 2F.

Figure 3:
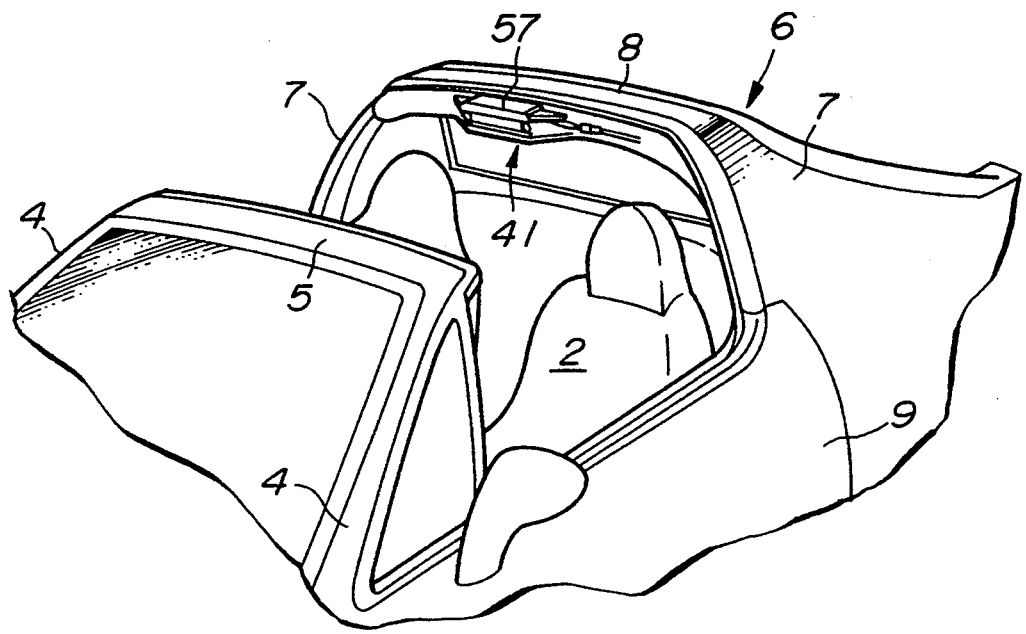
FIG. 3 is a fragmentary perspective view of the automobile, showing a tilt-up device for tilting the movable roof upwardly.
Figure 4:
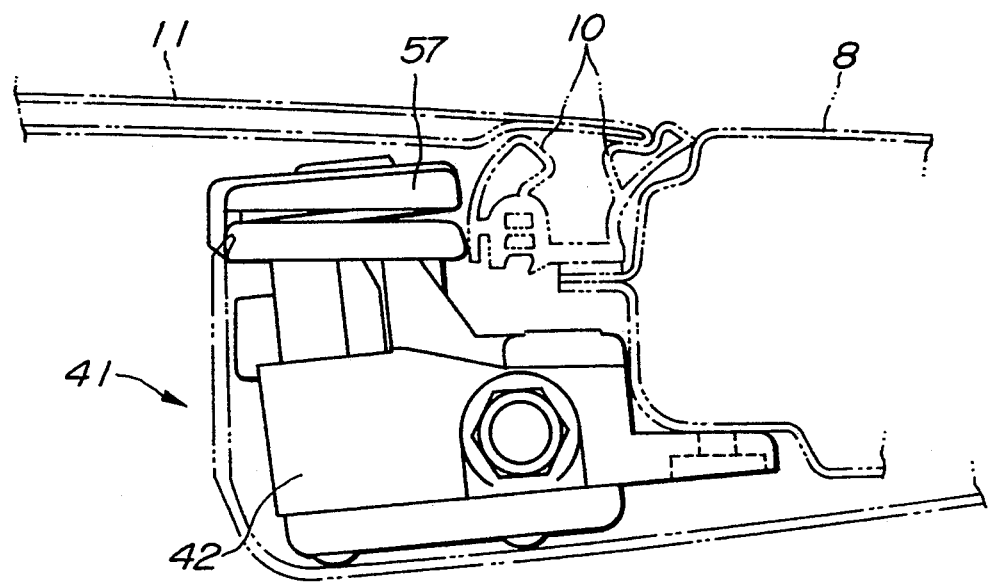
FIG. 4 is a schematic side elevational view of the tilt-up device.

As shown in FIGS. 3 and 4, the tilt-up device 41, which is of a unitized structure, is positioned in front of a water seal 10 attached to the front end surface of the rear roof rail 8 which faces the passenger's compartment 2. When the movable roof 11 is in the closed position, the rear end of the movable roof 11 rests on the water seal 10.

Figure 5:
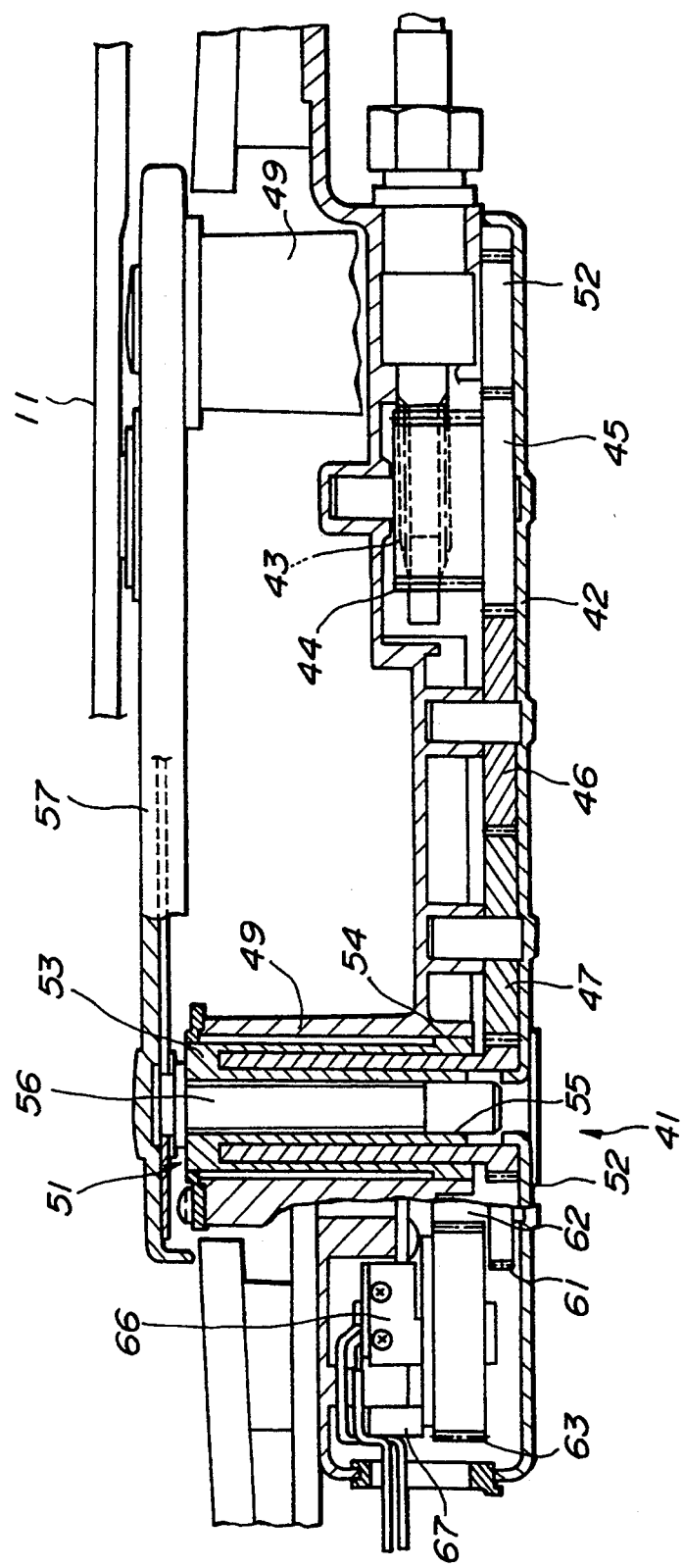
FIG. 5 is a cross-sectional view of the tilt-up device.
Figure 6:
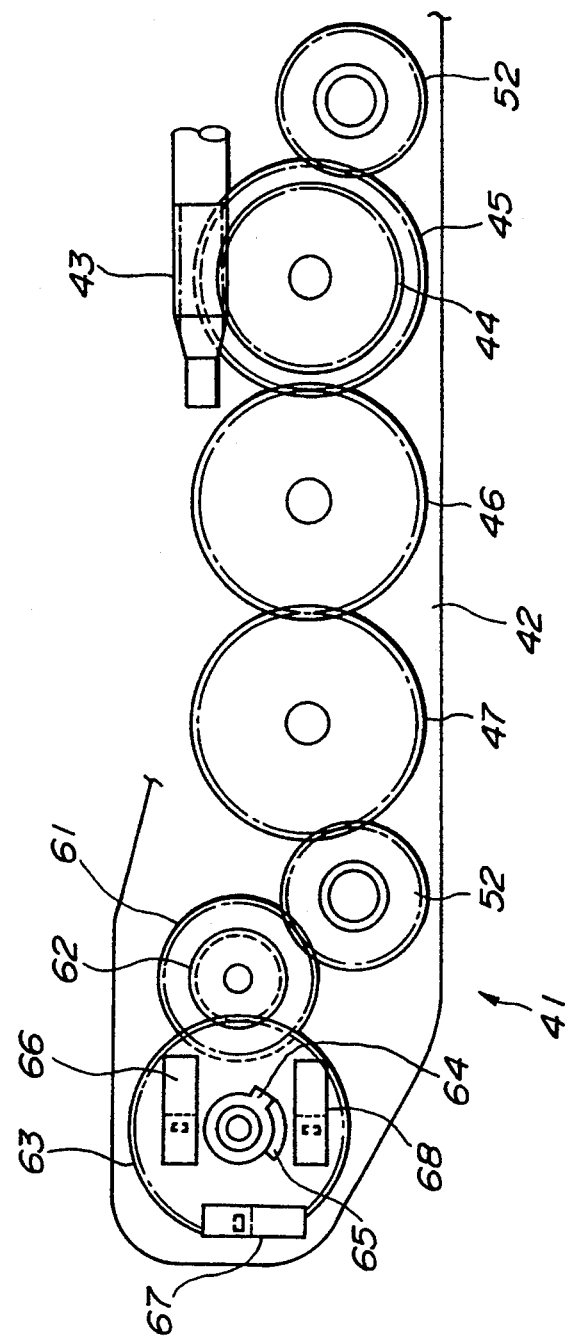
FIG. 6 is a schematic plan view of a gear mechanism of the tilt-up device.

As shown in FIGS. 5 and 6, the tilt-up device 41 has a unit base 42 fastened to the rear roof rail 8, a motor output shaft 43 extending from an electric motor (not shown), a pair of laterally spaced tubular shaft supports 49 extending integrally from the unit base 42, and a pair of tilt-up shafts 51 rotatably supported in the respective tubular shaft supports 49.

The motor output shaft 43 has a worm held in mesh with a worm wheel 44 coaxial with a gear 45 that is held in mesh with a gear 52 coaxial with one of the tilt-up shaft 51. The gear 45 is also held in operative mesh with another gear 52 coaxial with the other tilt-up shaft 51 through two gears 46, 47. The gears 45, 46, 47 are rotatably supported on the unit base 42.

The two tilt-up shafts 51 are identical in structure to each other. More specifically, each of the tilt-up shafts 51 has a first shank 53 fitted over the gear 52 through angular cross-sectional-shape engagement for vertical sliding movement, the first shank 53 being held in threaded engagement with an inner circumferential surface of the tubular shaft support 49 through screw teeth 54. A second shank 56 extends through the first shank 53 and is held in threaded engagement with an inner circumferential surface of the tubular first shank 53 through screw teeth 55. A tilt-up plate 57 that is positioned below the rear end of the movable roof 11 (see FIG. 4) is fastened to the upper end of the second shank 56.

Rotational movement that has been transmitted from the motor output shaft 43 to the gear 52 is converted by the screw teeth 54 into vertical and rotational movement of the first shank 53, and the rotational movement of the first shank 53 is converted by the screw teeth 55 into vertical movement of the second shank 56 for vertically moving, i.e., lifting or lowering, the tilt-up plate 57 and hence the rear end of the movable roof 11.

Figure 7:
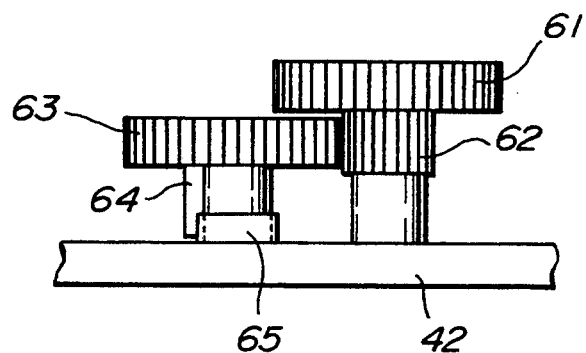
FIG. 7 is a front elevational view of a stopper mechanism of the tilt-up device.
Figure 8:
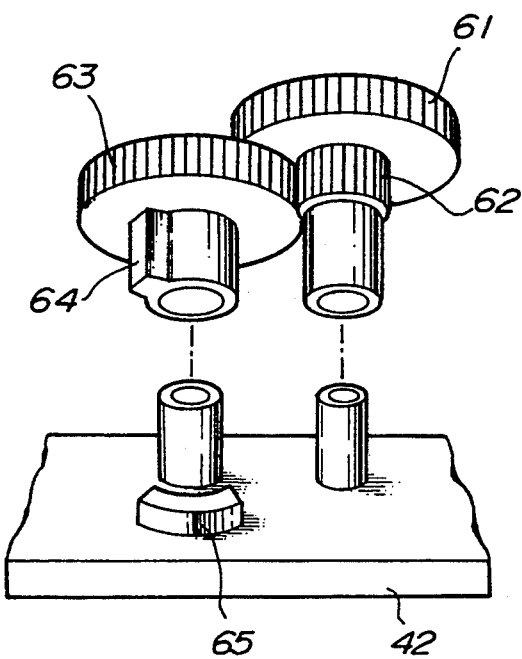
FIG. 8 is an exploded perspective view of the stopper mechanism.

The gear 52 is held in mesh with a gear 61 coaxial with a gear 62 that meshes with a gear 63. The gears 61, 62, 63 are rotatably supported on the unit base 42. As also shown in FIGS. 7 and 8, the gear 63 has an integral stopper projection 64, and the unit base 42 has an integral stopper projection 65. These stopper projections 64, 65 are angularly positioned relatively to each other such that they engage each other upon rotation of the gear 63 through a certain angular interval. Therefore, the tilt-up shaft 51 is prevented from being lifted and lowered beyond certain limit positions defined by the stopper projections 64, 65, and hence the screw threads 54, 55 are prevented from forcibly biting into associated surfaces in those limit positions.

The vertical movement of the tilt-up shaft 51 can be detected by microswitches 66, 67, 68.

The unitized tilt-up device 41 is positioned on the front end of the rear roof rail 8 forwardly of the rain seal 10 so as to project into the passenger's compartment. Therefore, the tilt-up device 41 is not exposed to view on the upper surface of the rear roof rail 8. The rear roof rail 8 is thus neat in appearance when the movable roof 11 is stored in the trunk lid 21, opening the passenger's compartment 2.

Furthermore, since the tilt-up device 41 is positioned forwardly of the water seal 10 and the rear end of the movable roof 11 rests on the water seal 10 when the movable roof 11 is in the closed position, rainwater is prevented from entering the tilt-up device 41.

Inasmuch as the tilt-up device 41 is also positioned laterally centrally on the rear roof rail 8, as described above, it does not reduce the head clearance for the driver and passenger who sit in the passenger's compartment 2.

Figure 9:
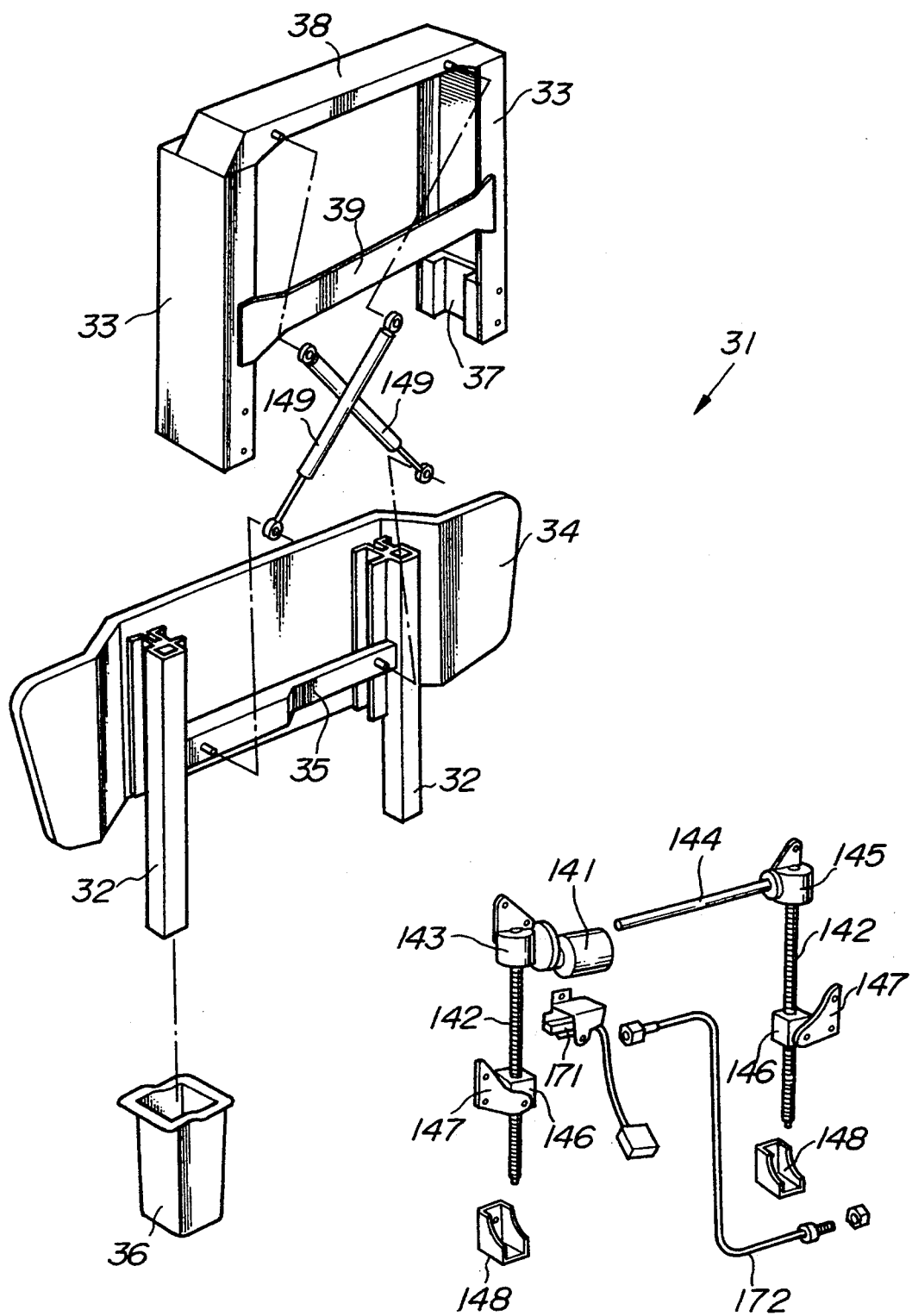
FIG. 9 is an exploded perspective view of a trunk lid lifting and lowering device for lifting and lowering the trunk lid.
Figure 10:
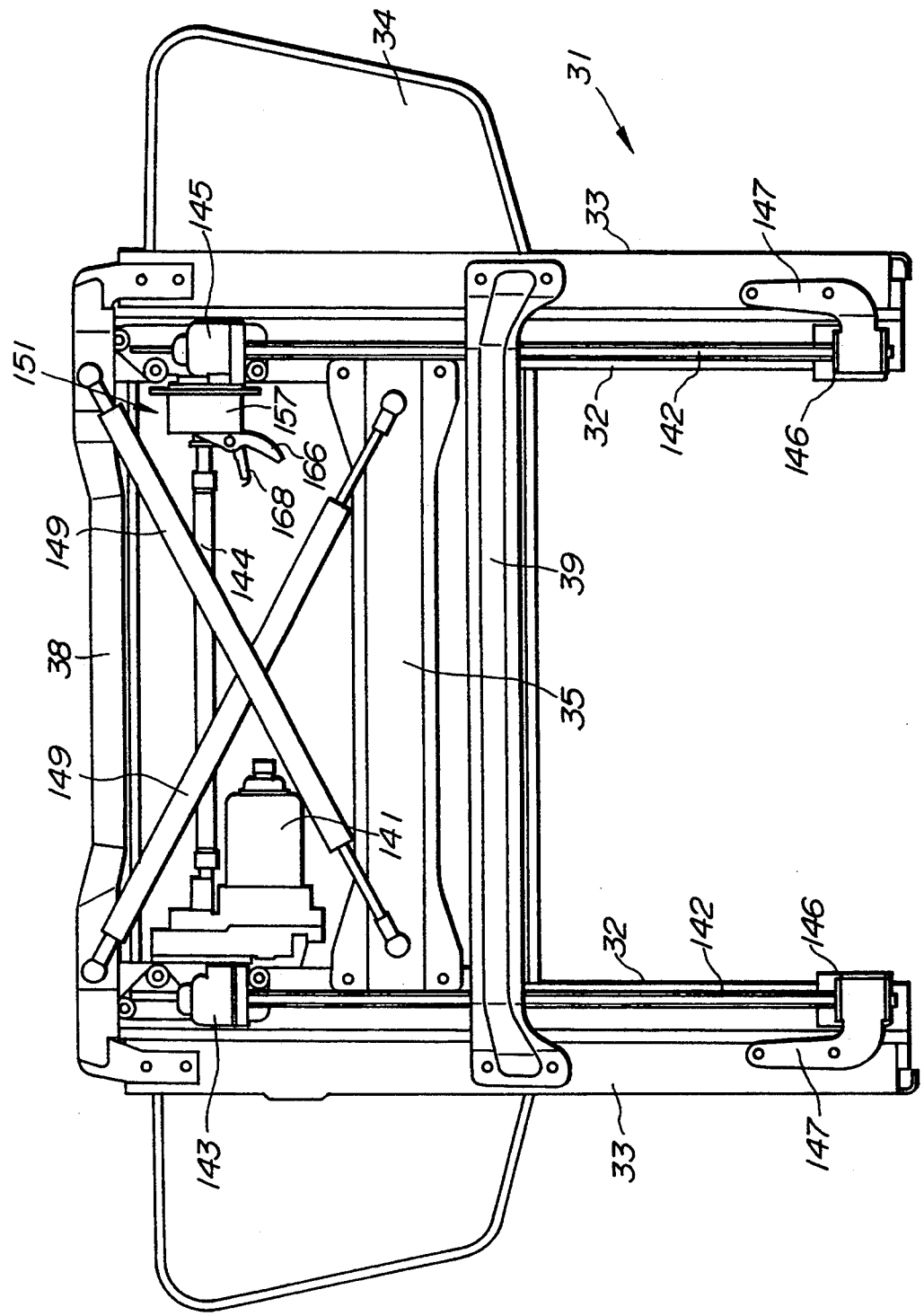
FIG. 10 is a rear elevational view of the trunk lid lifting and lowering device as it has lowered the trunk lid.
Figure 11:
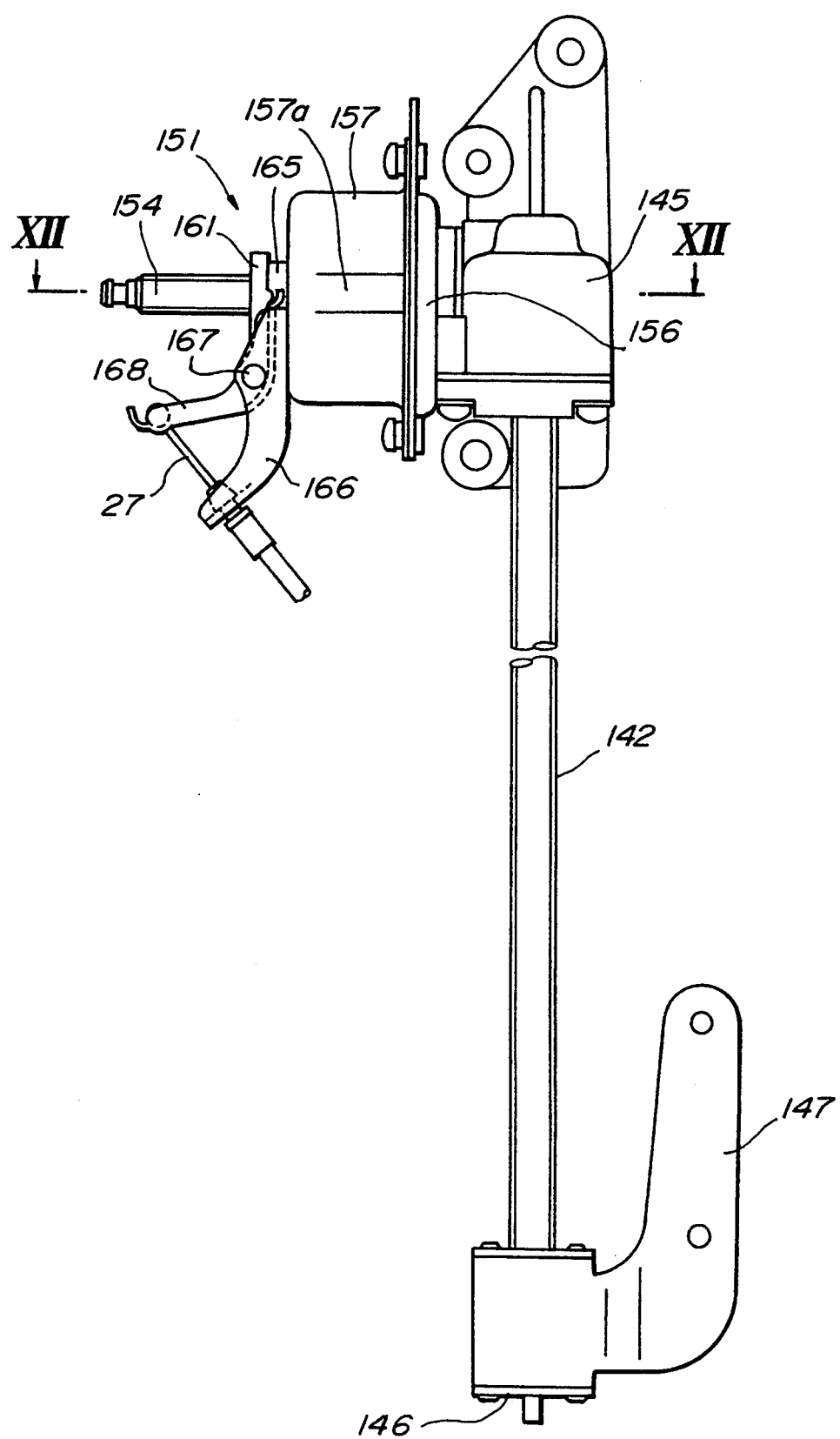
FIG. 11 is an enlarged rear elevational view of a stopper device and associated parts of the trunk lid lifting and lowering device.
Figure 12:
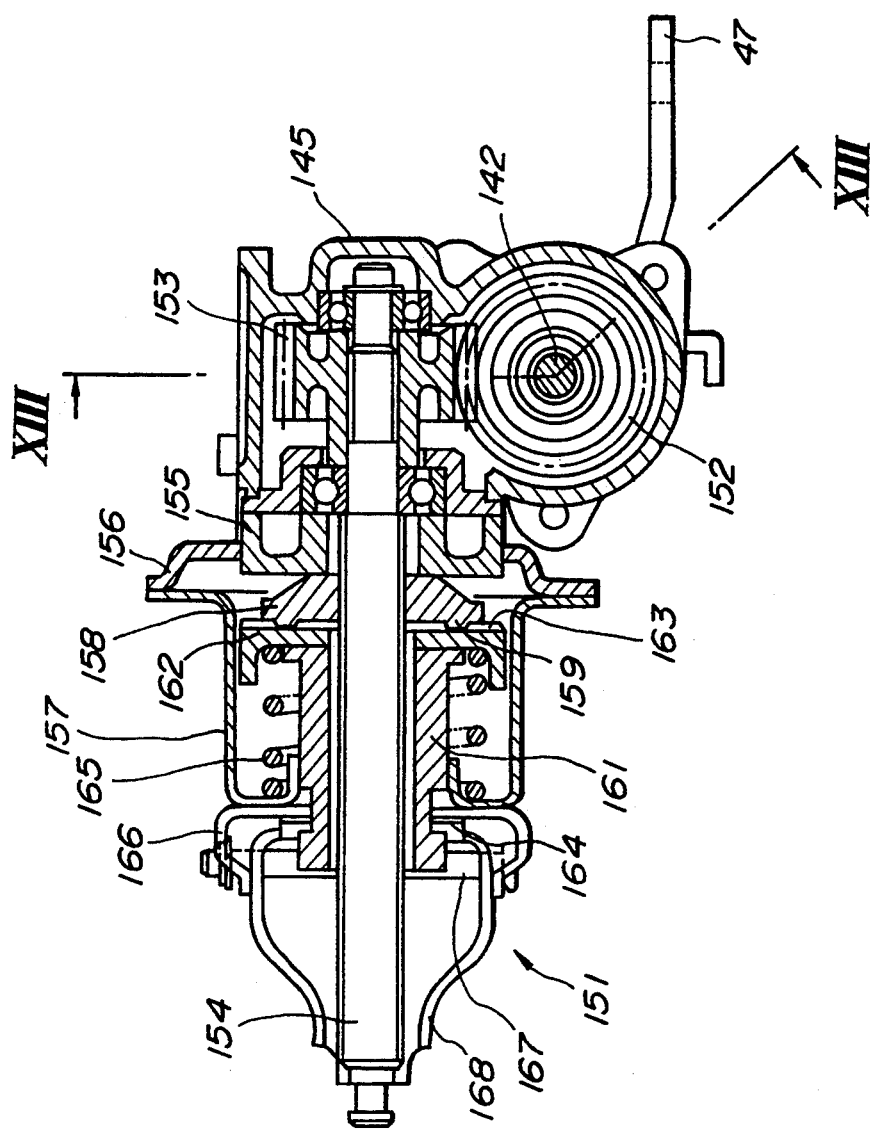
FIG. 12 is a cross-sectional view taken along line XII—XII of FIG. 11.
Figure 13:
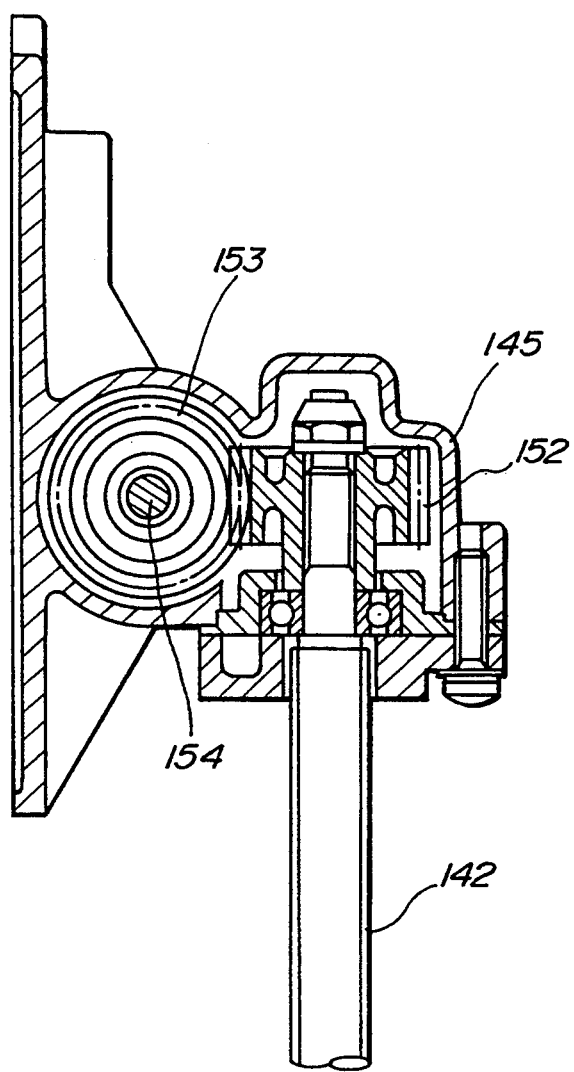
FIG. 13 is a cross-sectional view taken along line XIII—XIII of FIG. 12.
Figure 14:
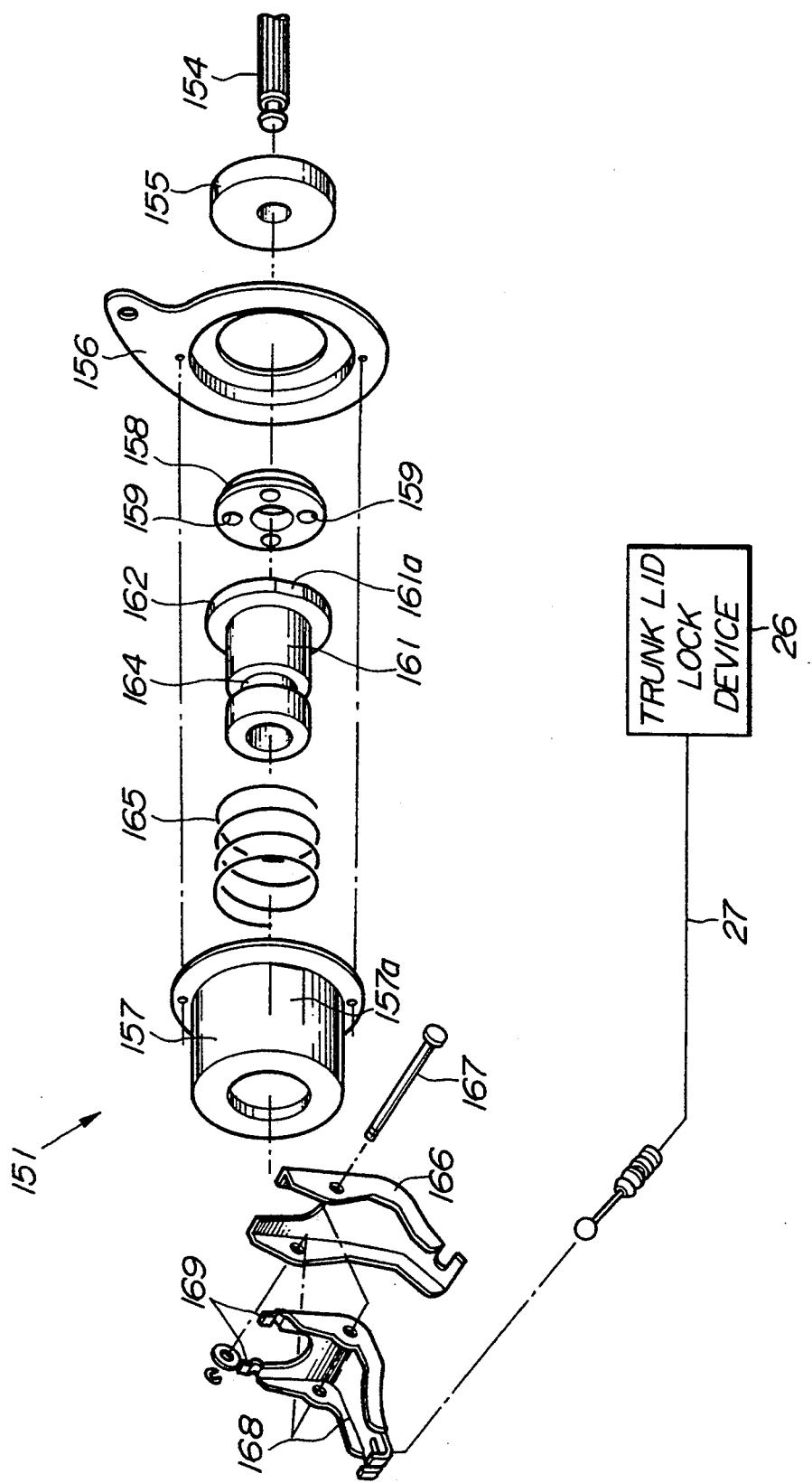
FIG. 14 is an explosive perspective view of the stopper device.

FIGS. 9 and 10 illustrate the trunk lid lifting and lowering device 31 in detail.

The vertical guide rails 32 are fastened to a fixed plate 34 and interconnected by a horizontal cross member 35 lying in a vertically intermediate position. The guide rails 32 are covered with respective rail covers 36 (one shown in FIG. 9).

The frames 33 are vertically movably supported on the respective guide rails 32 through respective bearing blocks 37 mounted on respective inner surfaces of the lower ends of the frames 33. The upper ends of the frames 33 are interconnected by a bulk head 38, and their vertically intermediate portions are interconnected by a horizontal cross member 39.

The trunk lid lifting and lowering device 31 also has a pair of laterally spaced feed screws 142 rotatable about their own axes by a common electric motor 141. Rotational power from the motor 141 is transmitted to the upper end of one of the feed screws 142 through a gear mechanism (not shown in FIGS. 9 and 10) in a gear case 143, and also to the upper end of the other feed screw 142 through a horizontal transmission shaft 144 and a gear mechanism (not shown in FIGS. 9 and 10) in a gear case 145. Nuts 146 are threaded over the respective feed screws 142, and connecting arms 147 are coupled respectively to the nuts 146.

The feed screws 142 vertically extend respectively along and adjacent to the guide rails 32. The gear cases 143, 145 are fastened to the respective guide rails 32, to which there are also connected respective brackets 148 that support the lower ends of the respective feed screws 142. The connecting arms 147 are fastened to respective lower portions of the frames 33.

Two crossing open stays 149 are Joined to and extend between the opposite ends of the cross member 35 and the opposite ends of the bulk head 38.

As shown in FIG. 10, a brake-type stopper device 151 is disposed between and coupled to the transmission shaft 144 and the gear mechanism in the gear case 145.

As shown in FIGS. 11 through 14, the stopper device 151 is mounted on a shaft 154 that is disposed between gears 152, 153 in the gear case 145 and the transmission shaft 144. The stopper device 151 comprises a gear case cover 155 covering the gear case 145, a mount bracket 156 supported on the gear case cover 155, a casing 157 fastened to the mount bracket 156, a stopper disk 158 disposed in the casing 157 and mounted on the shaft 154, a housing 161 disposed in the casing 157 loosely around the shaft 154 and having an axial end projecting out of the casing 157, a coil spring 165 disposed in the casing 157 around the housing 161, a lever holder 166 supported on the projecting end of the housing 161, and a release lever 168 pivotally supported on the lever holder 166 by a pivot pin 167.

The gear 153, which is held in mesh with the gear 152 mounted on the upper end of the feed screw 142, is mounted on one end of the shaft 54 that is axially connected to the transmission shaft 144. The stopper disk 158 is positioned axially adjacent to the gear case cover 155 and splined to the shaft 154. The stopper disk 158 has a plurality of angularly spaced convex lands 159 on one axial surface thereof which faces the housing 161.

The housing 161, which is axially movable on the shaft 154, has a disk flange 162 on one end thereof which faces the stopper disk 158. The disk flange 162 has a flat surface 161a on its outer circumferential edge which engages a flat surface 157a on the circumferential wall of the casing 157 so that the housing 161 is not rotatable with respect to the casing 157 and hence the shaft 154. The disk flange 162 has a plurality of angularly spaced grooves 163 defined in its surface facing the stopper disk 158. The convex lands 159 of the stopper disk 158 are received in the respective grooves 163 of the disk flange 162. The disk flange 162 is normally urged against the stopper disk 158 by the coil spring 165 that is disposed under compression between the disk flange 162 and an axial end wall of the casing 157.

The lever holder 166 is disposed adjacent to the casing 157, and the release lever 168, which is pivotally coupled to the lever holder 166 by the pivot pin 167, is connected to one end of a cable 27 whose other end is coupled to the trunk lid lock device 26. The release lever 168 has a bifurcated end 169 that engages a reduced-diameter portion 164 of the housing 161 which is positioned outside of the casing 157. When the trunk lid lock device 26 is unlocked, the cable 27 is pulled. When the cable 27 is pulled, the release lever 168 axially pulls the housing 161 against the bias of the coil spring 165, retracting the grooves 163 away from the convex lands 159, thus allowing the stopper disk 158 and hence the shaft 154 to rotate.

As shown in FIG. 9, the trunk lid lifting and lowering device 31 has a sensor 171 for detecting the vertical movement of one nut 146 and hence the frames 33 and the trunk lid 21, and an emergency cable 172 to be connected between an output shat of the motor 141 and an unshown manual operation device, for permitting the trunk lid lifting and lowering device 31 to be manually actuated in case of emergency.

The trunk lid lifting and lowering device 31 operates as follows: When the motor 141 is energized, the feed screws 142 are rotated about their own axes in synchronism with each other. The nuts 146 threaded over the respective feed screws 142 vertically move, causing the frames 33 coupled to the nuts 146 by the respective arms 147 to slide vertically along the guide rails 32 through the bearing blocks 37. Therefore, the trunk lid 21 fixed to the frames 33 are lifted or lowered.

When the rear end of the trunk lid 21 is locked by the trunk lid lock device 26 in the lowered position of the trunk lid 21, the cable 27 extending from the trunk lid lock device 26 is released. The release lever 168 is turned in a direction to permit the housing 161 and the disk flange 162 to move toward the stopper disk 158 under the bias of the coil spring 165 until the convex lands 159 are inserted into and pressed against the bottoms of the grooves 163. The stopper disk 158 and hence the shaft 154 are now prevented from rotation due to frictional engagement between the stopper disk 158 and the disk flange 162.

Therefore, when the trunk lid 21 is lowered to close the trunk 3 and locked by the trunk lid lock device 26, the shaft 154 is prevented from rotation by the stopper device 151. As a result, the trunk lid lifting and lowering device 31 is locked against operation, and the front end of the trunk lid 21 that is supported on the automobile body 1 through the trunk lid lifting and lowering device 31 is also locked against fluctuations.

When the trunk lid lock device 26 is unlocked, the cable 27 is pulled, enabling the bifurcated end 169 of the release lever 168 to move the housing 161 away from the stopper disk 158, which is then released from the disk flange 162. The shaft 154 is now free to rotate with the stopper disk 158. Accordingly, the trunk lid 21 can now be lifted or lowered by the trunk lid lifting and lowering device 31.

The illustrated stopper device 151 comprises a dog-clutch-type brake. However, it may comprise a frictional brake having frictionally engageable rubber elements.

FIGS. 15 through 20 show a roof opening and closing device for opening and closing the movable roof 11.

The roof opening and closing device is associated with each of the pin locking mechanisms 70 and the corresponding engaging pin 25 of the roof slide device 23. However, the roof opening and closing device will be described in detail with respect to one of the pin locking mechanisms 70 and the corresponding engaging pin 25 of the roof slide device 23.

Figure 17:
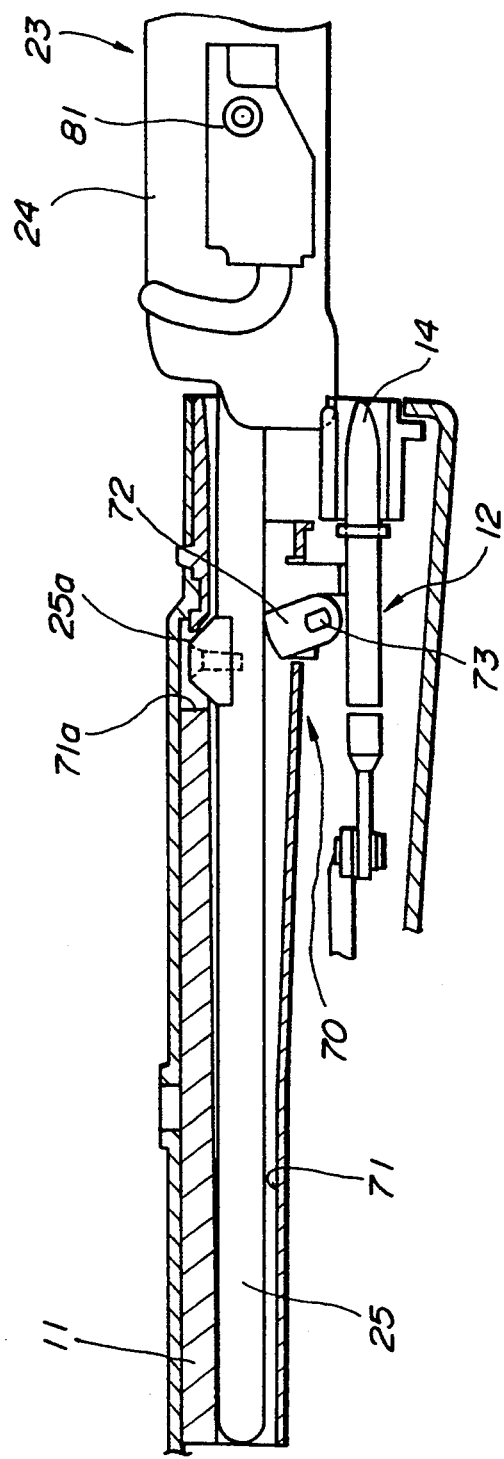
FIGS. 17 through 19 are cross-sectional views showing different operating positions of the roof opening and closing device.

As shown in FIGS. 17 through 20, the engaging pin 25 has a lock member 25a fastened to an upper surface thereof near its proximal end. The movable roof 11 has a hole 71 defined therein and opening rearwardly at its rear end for receiving the engaging pin 25 when the slider 24 moves forwardly to the movable roof 11 as shown in FIG. 17.

When the engaging pin 25 is inserted in the hole 71, the lock member 25a disengageably engages the roof 11 as described later on. When the trunk lid 21 is lifted to its upper limit position, the movable roof 11 can be stored into and removed from the roof storage region in the trunk lid 21.

As shown in FIGS. 15 through 19, the pin locking mechanism 70 has a pusher 72 angularly movably mounted in the movable roof 11 beneath the hole 71 for movement into and out of the hole 71. The hole 71 has a diameter larger than the diameter of the engaging pin 25 so that the engaging pin 25 is loosely received in the hole 71. The movable roof 11 has a recess 71a forming a receptacle defined in an upper panel thereof near its rear end and opening into the hole 71. The recess 71a serves to receive the lock member 25a on the engaging pin 25 when the engaging pin 25 is inserted into the hole 71. When the engaging pin 25 is inserted in the hole 71, the lock member 25a can fit into the recess 71a. Upon fitting engagement of the lock member 25a in the recess 71a, the engaging pin 25 is locked in the movable roof 11, which is angularly moved to raise the front end thereof.

Figure 15:
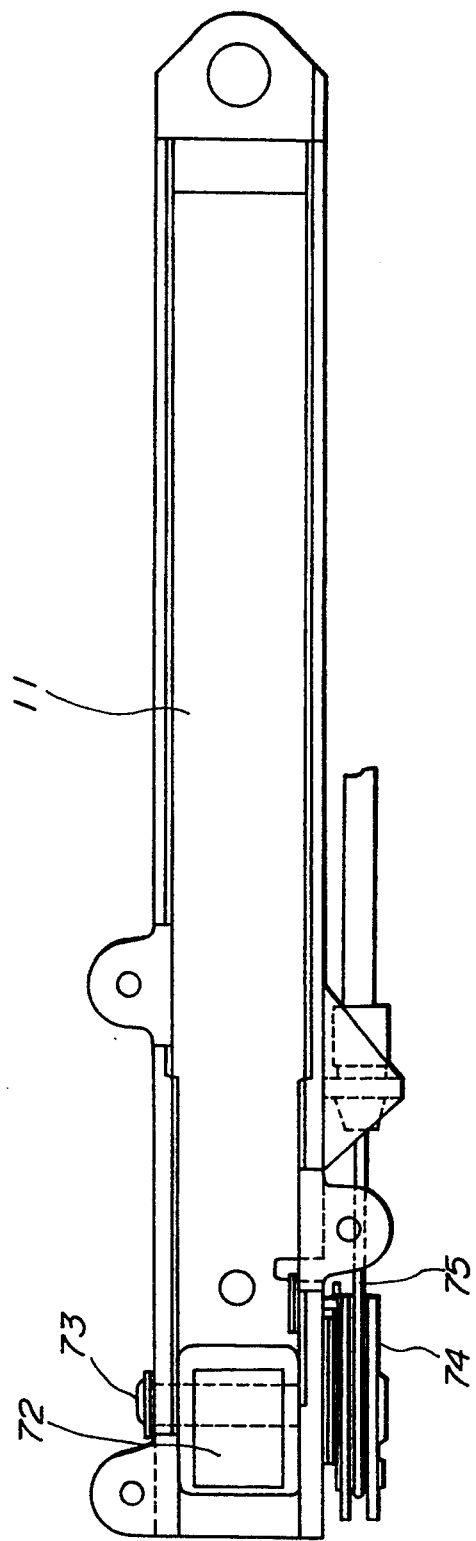
FIG. 15 a plan view of a portion of a roof opening and closing device for opening and closing the movable roof.
Figure 16:
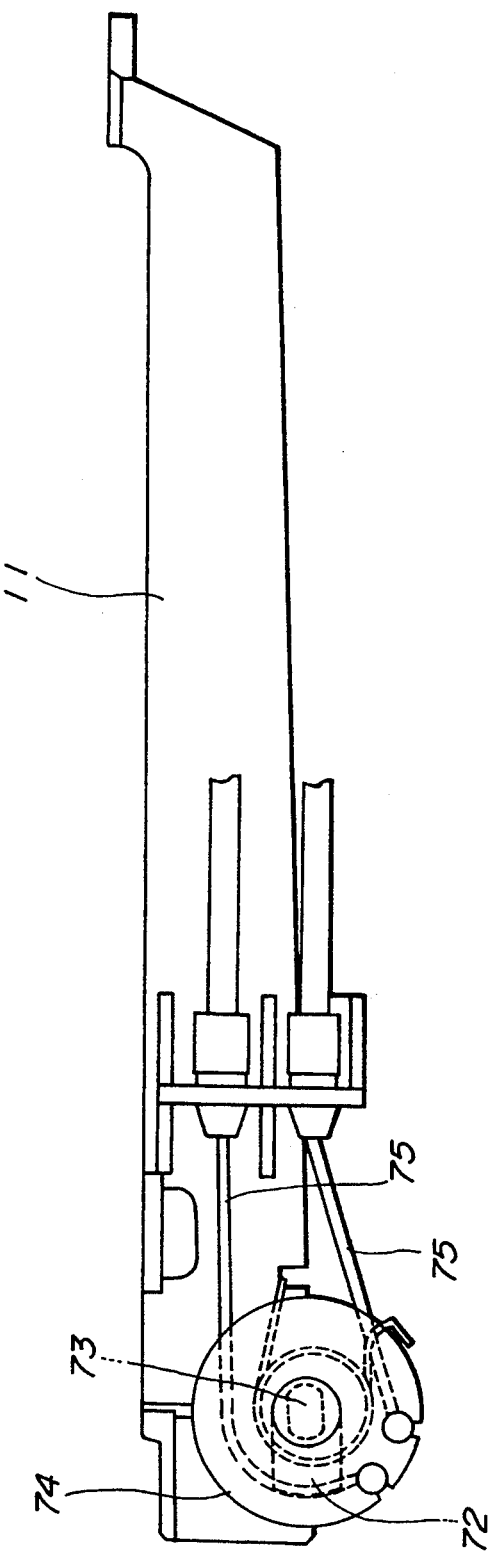
FIG. 16 is a side view of the roof opening and closing device.

The pusher 72, which is of a rectangular shape, is mounted on a rotatable shaft 73 extending transversely in the movable roof 11. When the pusher 72 projects into the hole 71 upon rotation of the shaft 73 after the engaging pin 25 has been inserted in the hole 71, the pusher 72 pushes the engaging pin 25 upwardly to displace the lock member 25a into the recess 71a, thus connecting the engaging pin 25 to the movable roof 11. As shown in FIGS. 15 and 16, one end of the shaft 73 is coupled to a rotatable pulley 74 on one side of the movable roof 11, and ends of two cables 75 are fixed to the pulley 74 at its circumferential edge. The cables 75 have other ends connected to a lever 76 (see FIG. 20) coupled to the handle 16.

Figure 20:
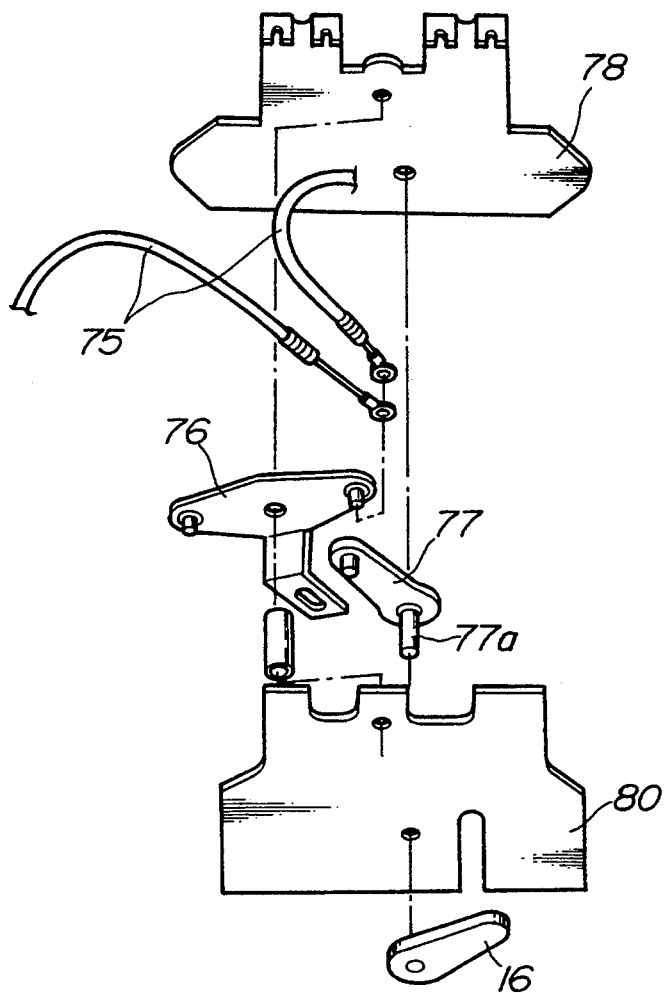
FIG. 20 is an exploded perspective view of another portion of the roof opening and closing device.

As shown in FIG. 20, the lever 76 is substantially T-shaped and angularly movably supported at its central portion on a bracket 78 that is fixedly mounted in the movable roof 11. The lever 76 has one end to which the cables 75 are secured and an opposite end that is Joined to one end of an arm 77 whose other end is angularly movably supported on an inner ornamental panel 80 of the movable roof 11 through a shaft 77a. The handle 16 is fixed to an end of the shaft 77a which projects through the inner ornamental panel 80.

When the handle 16 is manually turned by the driver of the automobile, the arm 77 is angularly moved to turn the lever 76, which then pulls one of the cables 75 and pushes the other cable 75. The pulley 74 is then turned to move the pusher 72 into or out of the hole 71 for thereby pushing the engaging pin 25 upwardly or allowing the engaging pin 25 to move downwardly.

Figure 18:
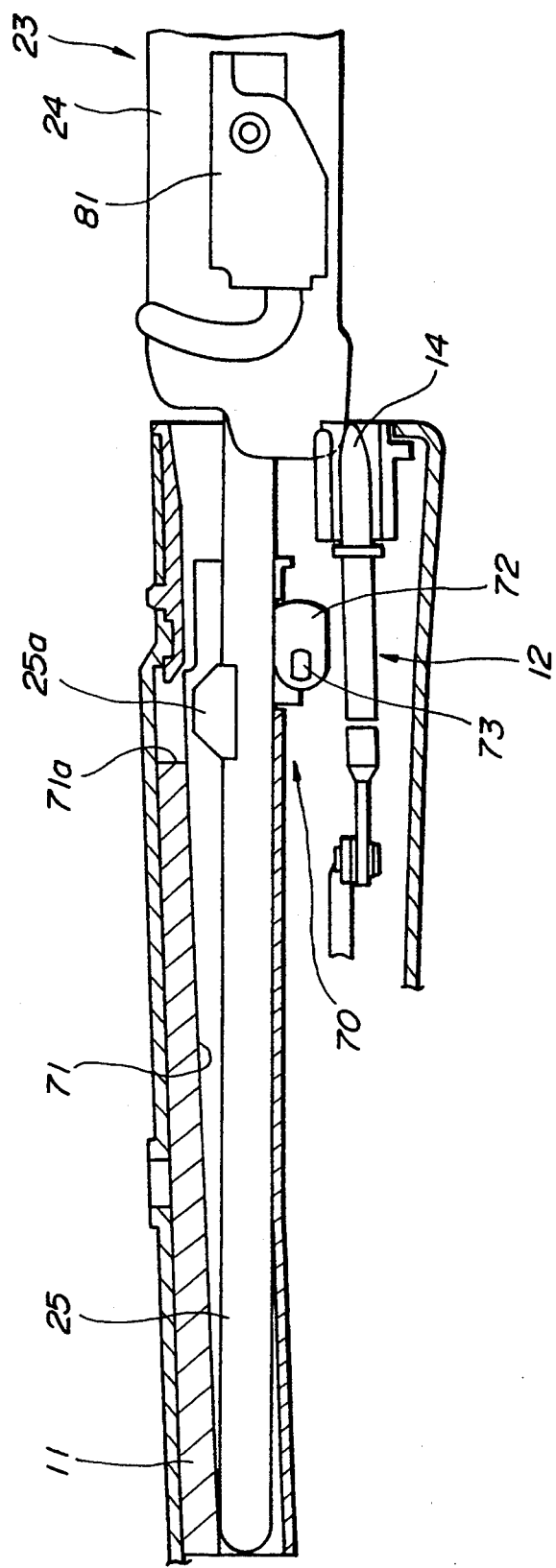
Figure 19:
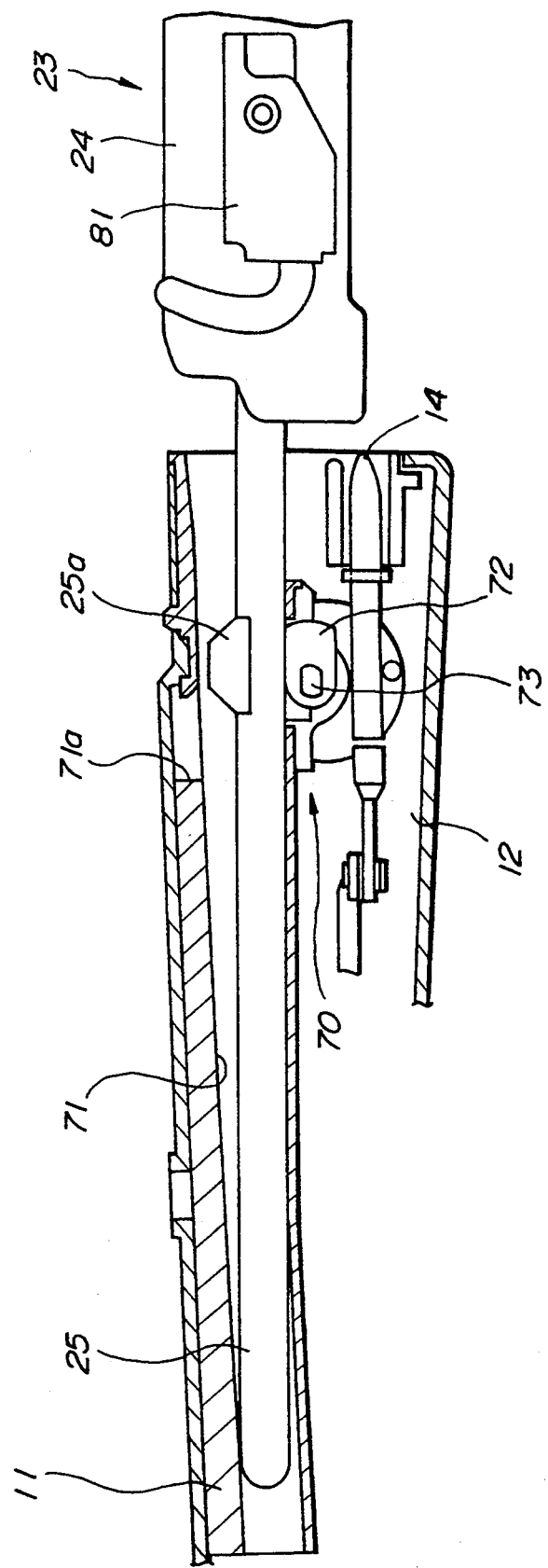

As shown in FIGS. 17 through 19, a microswitch 81 is mounted on a side of the roof slide device 23 for detecting the movement thereof toward and away from the movable roof 11.

When the driver manually turns the central handle 16 in an effort to store the movable roof 11 into the trunk lid 21, the lever 76 and the arm 77 are turned to cause the cables 75 to rotate the pulley 74, enabling the pusher 72 to project into the hole 71. The pusher 72 pushes the engaging pin 25 upwardly, forcing the lock member 25a into the recess 71a whereupon the movable roof 11 and the engaging pin 25 are coupled to each other. At this time, as shown in FIG. 17, the rear end of the movable roof 11 is lowered about the front end of the engaging pin 25, and the front end of the movable roof 11 is elevated. Therefore, any seal adjacent to the front end of the movable roof 11 is prevented from being damaged when the movable roof 11 is subsequently moved.

Upon movement of the movable roof 11 from the trunk lid 21 back to the closed position over the passenger's compartment 2, the front end of the movable roof 11 is also raised as shown in FIG. 17 when the movable roof 11 is in the position shown in FIG. 2D. Therefore, the front end of the movable roof 11 does not damage any seal that is positioned adjacent to the front end of the movable roof 11 at this time.

After the front end of the movable roof 11 is raised, the rear end of the movable roof 11 is also raised by the tilt-up device 41 as shown in FIG. 2C. The driver turns the handle 16 to disengage the engaging pin 25 from the movable roof 11, i.e., turn the pusher 72 out of the hole 71. As shown in FIG. 18, the rear end of the movable roof 11 is lifted, displacing the lock member 25a out of the recess 71a, and the front end of the movable roof 11 is lowered into intimate contact with the seal.

Thereafter, the roof slide device 23 moves to retract the engaging pin 25 into the trunk lid 21. At this time, the engaging pin 25 as it is retracted is guided by the pusher 72 as shown in FIG. 19.

As described above, since the front end of the movable roof 11 is lifted when the engaging pin 25 is coupled to the movable roof 11 by the pin locking mechanism 70, the front end of the movable roof 11 is prevented from interfering with the seal. The pin locking mechanism 70 and the roof slide device 23 are manually actuated by the driver while the movable roof 11 and the trunk lid 21 are being automatically actuated by the motors. Therefore, the driver can confirm how the pin locking mechanism 70 and the roof slide device 23 are operating during the process of movement of the movable roof 11 and the trunk lid 21. In addition, the entire assembly is relatively inexpensive because of such manually operated mechanism and device.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An automobile comprising:
    an automobile body having a movable roof movable from a normal position about a passenger's compartment, said movable roof having an axially elongated hole defined therein and opening at an end thereof;
    a roof storage member for storing said movable roof when moved from said normal position, said roof storage member having an axially elongated engaging pin connected therewith and movable substantially coaxially into and out of said hole; and
    a device for connecting said engaging pin and said movable roof for coincident movement, said device including a receptacle provided in one of said engaging pin and said movable roof, a projection carried by the other of said engaging pin and said movable roof, and means for selectively moving the axis of said engaging pin laterally with respect to the axis of said hole for placement of said projection into said receptacle, whereby said movable roof is secured to said engaging pin for movement therewith.

2. An automobile according to claim 1, wherein said receptacle is a recess defined in said movable roof and opening radially into said hole, said projection is a lock member mounted on said engaging pin and projecting radially therefrom, and said moving means is a pusher angularly movably disposed in said movable roof for pushing said engaging pin inserted in said hole to place said lock member into said recess for thereby connecting said engaging pin to said movable roof.

3. An automobile according to claim 2, wherein said device further comprises a manually operable handle mounted on said movable roof and operatively connected to said pusher.

4. In an automobile having an automobile body having a movable roof movable from a normal position above a passenger's compartment, and a roof storage member for storing said movable roof when moved from said normal position, said roof storage member having an axially elongated engaging pin connected therewith and movable substantially coaxially into and out of an axially elongated hole defined in the movable roof at an end thereof, a device for connecting said engaging pin and said movable roof for coincident movement, said device including a receptacle provided in one of said engaging pin and said movable roof, a projection carried by the other of said engaging pin and said movable roof, and means for selectively moving the axis of said engaging pin laterally with respect to the axis of said hole to place said projection in said receptacle, whereby said movable roof is secured to said engaging pin for movement therewith.

* * * * *